United States Patent
Yoshida

(10) Patent No.: US 9,548,938 B2
(45) Date of Patent: Jan. 17, 2017

(54) PACKET FORWARDING DEVICE AND PACKET FORWARDING METHOD, AND COMPUTER PROGRAM

(71) Applicant: Hiroshi Yoshida, Tokyo (JP)

(72) Inventor: Hiroshi Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 63 days.

(21) Appl. No.: 14/380,362

(22) PCT Filed: Feb. 26, 2013

(86) PCT No.: PCT/JP2013/001085
§ 371 (c)(1),
(2) Date: Aug. 21, 2014

(87) PCT Pub. No.: WO2013/128884
PCT Pub. Date: Sep. 6, 2013

(65) Prior Publication Data
US 2015/0036592 A1 Feb. 5, 2015

(30) Foreign Application Priority Data
Mar. 2, 2012 (JP) .................................. 2012-046675

(51) Int. Cl.
*H04W 72/12* (2009.01)
*H04L 12/863* (2013.01)
(Continued)

(52) U.S. Cl.
CPC ........... *H04L 47/6215* (2013.01); *H04L 47/14* (2013.01); *H04L 47/60* (2013.01); *H04W 72/1236* (2013.01); *H04W 28/02* (2013.01)

(58) Field of Classification Search
CPC ...... H04L 47/14; H04L 47/60; H04L 47/6215; H04W 72/1236; H04W 28/02
(Continued)

(56) References Cited

U.S. PATENT DOCUMENTS 6,850,490 B1 * 2/2005 Woo ..................... H04L 12/5693
370/230
2004/1008236   4/2004 Kitazawa et al.
(Continued)

FOREIGN PATENT DOCUMENTS

EP         1411685      4/2004
JP     2004-140604      5/2004
(Continued)

OTHER PUBLICATIONS

Extended European Search Report corresponding to European Application No. 13755386.3, Sep. 24, 2015, 6 pages.
(Continued)

*Primary Examiner* — Maharishi Khirodhar
*Assistant Examiner* — Natali N Pascual Peguero
(74) *Attorney, Agent, or Firm* — Wilmer Cutler Pickering Hale and Dorr LLP

(57) ABSTRACT

Disclosed is a packet forwarding device which can reduce a development cost and realize desired QoS control.
The packet forwarding device includes a second scheduler 2 including a second packet queue corresponding to each first packet queue included in a first scheduler, a second packet classification unit 22 which sorts a packet data to each second packet queue based on a second classification different from the classification set by the first scheduler, a throughput estimation unit 24 which estimates a throughput indicating an amount of the packet data forwarded to an information processing terminal from the first packet queue corresponding to the second packet queue, and a second packet scheduling unit 25 which forwards the packet data accumulated in each second packet queue based on the throughput and the priority of each second packet queue.

7 Claims, 10 Drawing Sheets

(51) Int. Cl.
*H04L 12/801* (2013.01)
*H04L 12/869* (2013.01)
*H04W 28/02* (2009.01)

(58) Field of Classification Search
USPC .................................. 370/328, 351, 355, 412
See application file for complete search history.

(56) References Cited

U.S. PATENT DOCUMENTS

| | | |
|---|---|---|
| 2006/0242319 A1 | 10/2006 | Sang et al. |
| 2007/0053331 A1 | 3/2007 | Kolding et al. |
| 2007/1023033 | 10/2007 | Sang et al. |
| 2009/0219912 A1 | 9/2009 | Wengerter et al. |

FOREIGN PATENT DOCUMENTS

| | | |
|---|---|---|
| JP | 2007-159131 | 6/2007 |
| JP | 2008-211759 | 9/2008 |

OTHER PUBLICATIONS

International Search Report corresponding to PCT/JP2013/001085, mailing date of Apr. 23, 2013, 2 pages.
Ono, Masahiro, et al., "A Proposal of All-IP Mobile Wireless Network Architecture(3): QoS Packet Scheduler for Base Stations", IEICE Technical Report, MoMuC, Mobile Multimedia Tsushin, May 17, 2002, pp. 13 to 18 (6 pages).

\* cited by examiner

Fig. 3

| QCI | Type | Priority | Example Service |
|---|---|---|---|
| 1 | GBR | 2 | Conversation Voice |
| 2 | GBR | 4 | Conversation Voice |
| 3 | GBR | 3 | Real Time Gaming |
| 4 | GBR | 5 | Non-Conversation Voice |
| 5 | Non-GBR | 1 | IMS Signaling |
| 6 | Non-GBR | 6 | TCP-based |
| 7 | Non-GBR | 7 | Interractive Gaming |
| 8 | Non-GBR | 8 | TCP-based |
| 9 | Non-GBR | 9 | |

PACKET FORWARDING DEVICE AND PACKET FORWARDING METHOD, AND COMPUTER PROGRAM

CROSS-REFERENCE TO RELATED APPLICATIONS

This application is a national stage application of International Application No. PCT/JP2013/001085 entitled "PACKET FORWARDING DEVICE AND PACKET FORWARDING METHOD, AND COMPUTER PROGRAM" filed on Feb. 26, 2013, which claims priority to Japanese Patent Application No. 2012-046675 filed on Mar. 2, 2012, the disclosure of which is hereby incorporated by reference in their entirety.

TECHNICAL FIELD

The present invention relates to a packet forwarding device and in particular, relates to a packet forwarding device including a plurality of packet queues.

BACKGROUND ART

When the packet data is forwarded to a terminal via a communication network (hereinafter, abbreviated as "network" in the present application), it is desirable to perform QoS (Quality of Service) control in a wireless base station. The reason is because a communication bandwidth (communication speed) and an allowable amount of delay required when transmitting the packet data are different in accordance with types of the forwarded packet data. For example, when the packet data is video streaming data, the communication bandwidth has to be greater than an encoding rate indicating a data size per unit reproduction time of the video streaming data. When the packet data is voice data for voice communication, the allowable amount of delay needs to be less than several hundred milliseconds. On the other hand, when the packet data is electronic mail data, the communication bandwidth and the allowable amount of delay are not specified in particular.

Especially, when the packet data is forwarded to the terminal from the wireless base station via the network, the communication bandwidth and the delay amount greatly vary by various factors such as a radio wave interference, a change in radio wave intensity, and the like because of characteristics of a wireless access. Therefore, QoS control is very important.

As an example, patent document 1 discloses a technology for a packet forwarding device. The packet forwarding device includes a queue provided for each of a plurality of services, means for sorting the packet to be forwarded to each queue, and means for performing wireless transmission based on a priority value calculated for each queue.

CITATION LIST

Patent Literature

[PTL 1] Japanese Patent Application Laid-Open No. 2008-211759

SUMMARY OF INVENTION

Technical Problem

However, in the above-mentioned technology, in order to realize a desired QoS control function in an already installed packet forwarding device, all or most of the packet forwarding device needs to be replaced. In this case, the development cost of the packet forwarding device increases.

When the already installed packet forwarding device has a function and a specification specified by a predetermined standard specification, the packet forwarding device disclosed in PTL 1 needs to operate according to the rule of the standard specification. However, when the packet forwarding device is modified in order to perform an operation that is not specified by the rule of the standard specification, a problem in which the above-mentioned configuration cannot be introduced into the packet forwarding device occurs.

The present invention is made in order to solve the above-mentioned problem. A main purpose of the present invention is to provide a packet forwarding device which realizes desired QOS control, reduces a development cost, and can be easily introduced and the like.

Solution to Problem

In order to achieve the above-mentioned object, a packet forwarding device that is one aspect of the present invention forwards packet data received via a network to an information processing terminal. The packet forwarding device is characterized by including:

a first scheduler including a first packet classification unit for sorting the packet data to one or more first packet queues corresponding to each of the information processing terminals in accordance with a first classification information and accumulating it, and a first packet scheduling unit for forwarding the packet data accumulated in each first packet queue to the information processing terminal corresponding to the first packet queue based on a priority set to each first packet queue; and a second scheduler including a second packet classification unit for sorting the packet data to one or more second packet queues corresponding to each of the first packet queues based on a second classification information different from the first classification information and accumulating it, a throughput estimation unit for estimating a throughput indicating an amount of the packet data per unit time forwarded to the information processing terminal from the first packet queue corresponding to the second packet queue, and a second packet scheduling unit for forwarding the packet data accumulated in each second packet queue based on the throughput and the priority set to each second packet queue.

As another aspect for achieving the object, a program is another mode of the present invention and a computer program. The computer program is characterized by causing a packet forwarding device which forwards packet data received via a network to an information processing terminal to realize:

a function that sorts the packet data to one or more first packet queues corresponding to each of the information processing terminals according to a first classification information, accumulate it, and forwards the packet data accumulated in each first packet queue to the information processing terminal corresponding to the first packet queue based on a priority set to each first packet queue; and a function that sorts the packet data to one or more second packet queues corresponding to each of the first packet queues based on a second classification information different from the first classification information, accumulate it, estimates a throughput indicating an amount of the packet data per unit time forwarded to the information processing terminal from the first packet queue corresponding to the second packet queue, and forwards the packet data accumulated in each second packet queue based on the throughput and the priority set to each second packet queue.

As another aspect for achieving the object, a packet forwarding method that is another mode of the present invention characterized by including, in a packet forwarding device which forwards packet data received via a network to an information processing terminal, sorting the packet data to one or more first packet queues corresponding to each of the information processing terminals according to a first classification information, accumulating it, and forwarding the packet data accumulated in each first packet queue to the information processing terminal corresponding to the first packet queue based on a priority set to each first packet queue; and sorting the packet data to one or more second packet queues corresponding to each of the first packet queues based on a second classification information different from the first classification information, accumulating it, estimating a throughput indicating an amount of the packet data per unit time forwarded to the information processing terminal from the first packet queue corresponding to the second packet queue, and forwarding the packet data accumulated in each second packet queue based on the throughput and the priority set to each second packet queue.

Advantageous Effects of Invention

According to the present invention, a packet forwarding device which realizes desired QOS control, reduces a development cost, and can be easily introduced and the like can be realized.

BRIEF DESCRIPTION OF DRAWINGS

FIG. 3 is a figure showing an example of a classification by a first packet classification unit disclosed in FIG. 2.

DESCRIPTION OF EMBODIMENTS

Hereinafter, an exemplary embodiment of the present invention will be described in detail with reference to a drawing.

<First Exemplary Embodiment>

Figure 6:
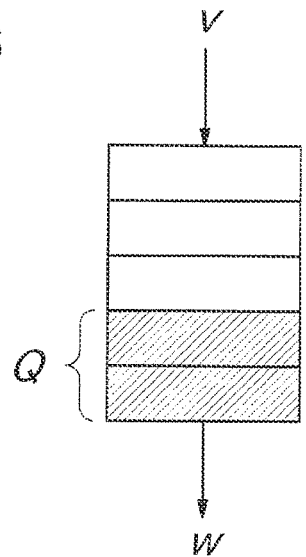
FIG. 6 is figure schematically showing a queue length of a packet queue installed in a packet forwarding device disclosed in FIG. 1 and an input-output.
Figure 7:
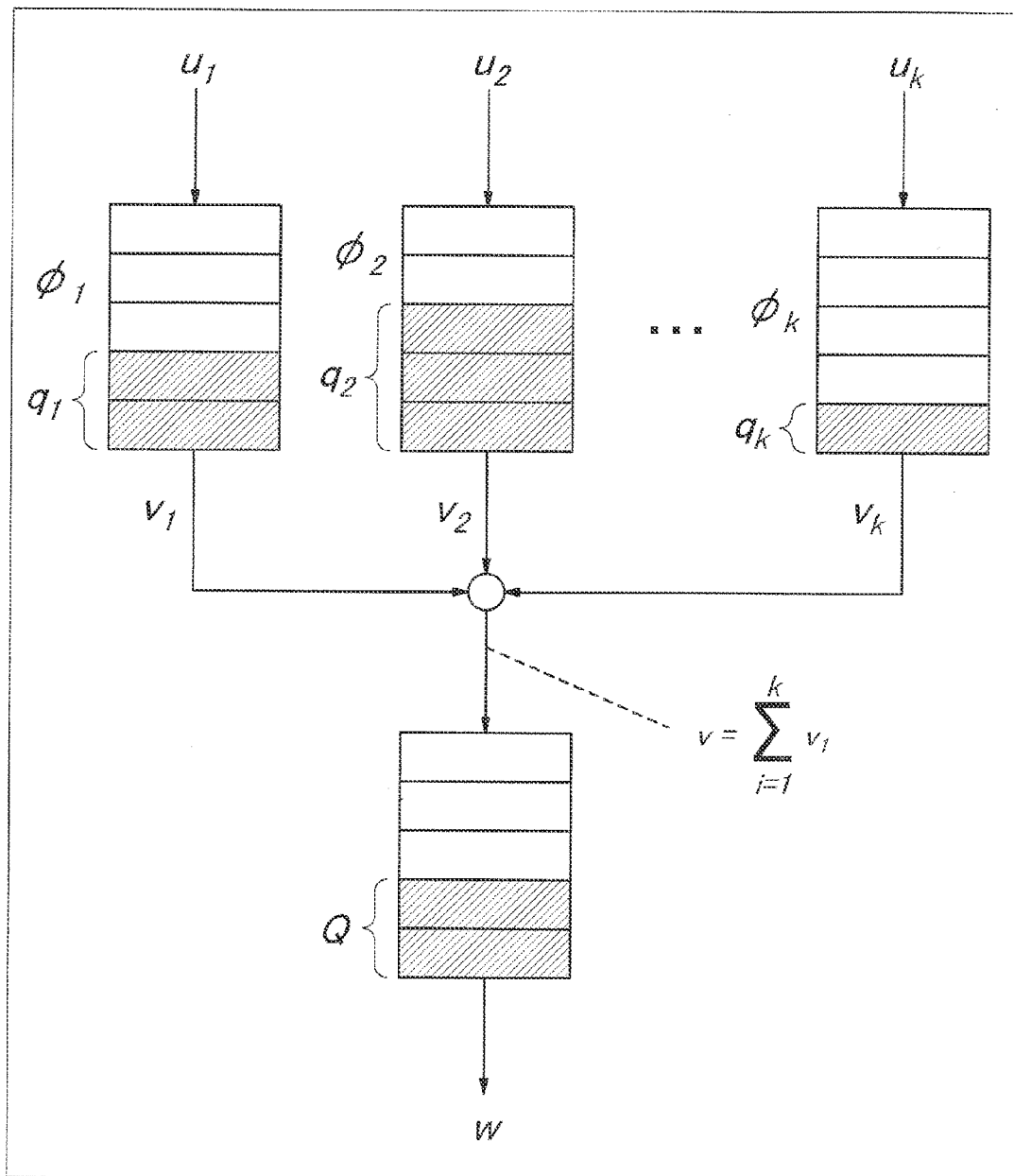
FIG. 7 is a figure showing a model for explaining a function of a second packet scheduling unit disclosed in FIG. 4.
Figure 8:
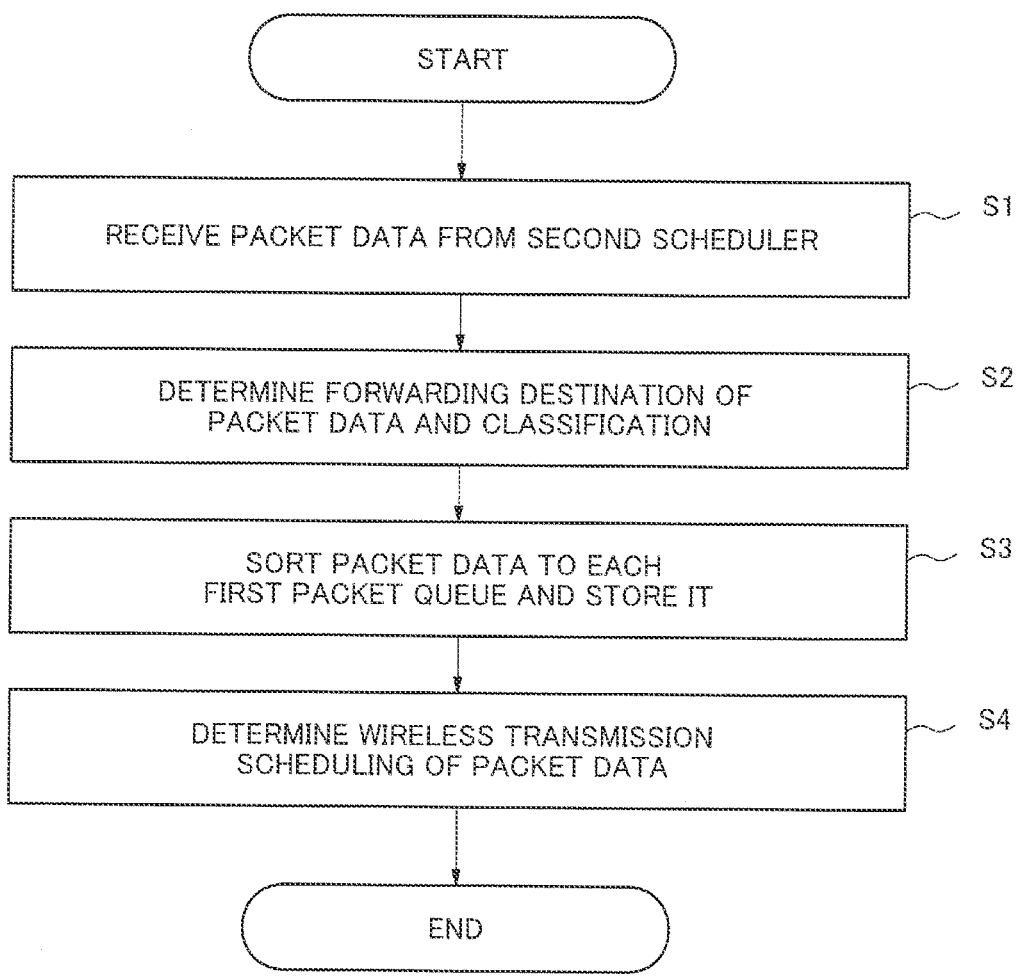
FIG. 8 is a flowchart showing operation of a first scheduler installed in a packet forwarding device disclosed in FIG. 1.
Figure 9:
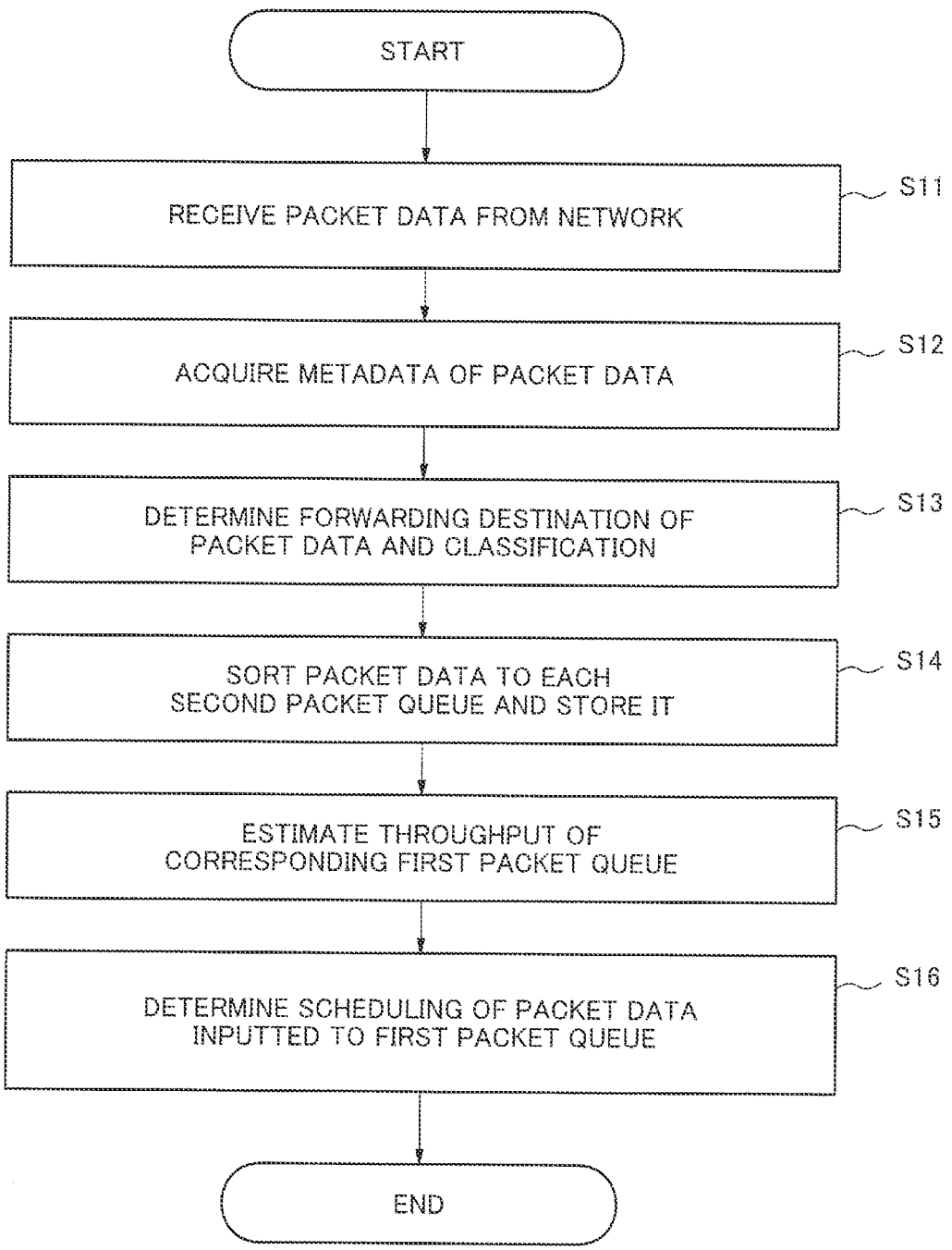
FIG. 9 is a flowchart showing operation of a second scheduler installed in a packet forwarding device disclosed in FIG. 4.

A first exemplary embodiment of the present invention will be described with reference to FIG. 1 to FIG. 9. FIG. 1 to FIG. 7 are figures for explaining a configuration and a function of a packet forwarding device. FIGS. 8 and 9 are figures for explaining operation of the packet forwarding device.

Figure 1:
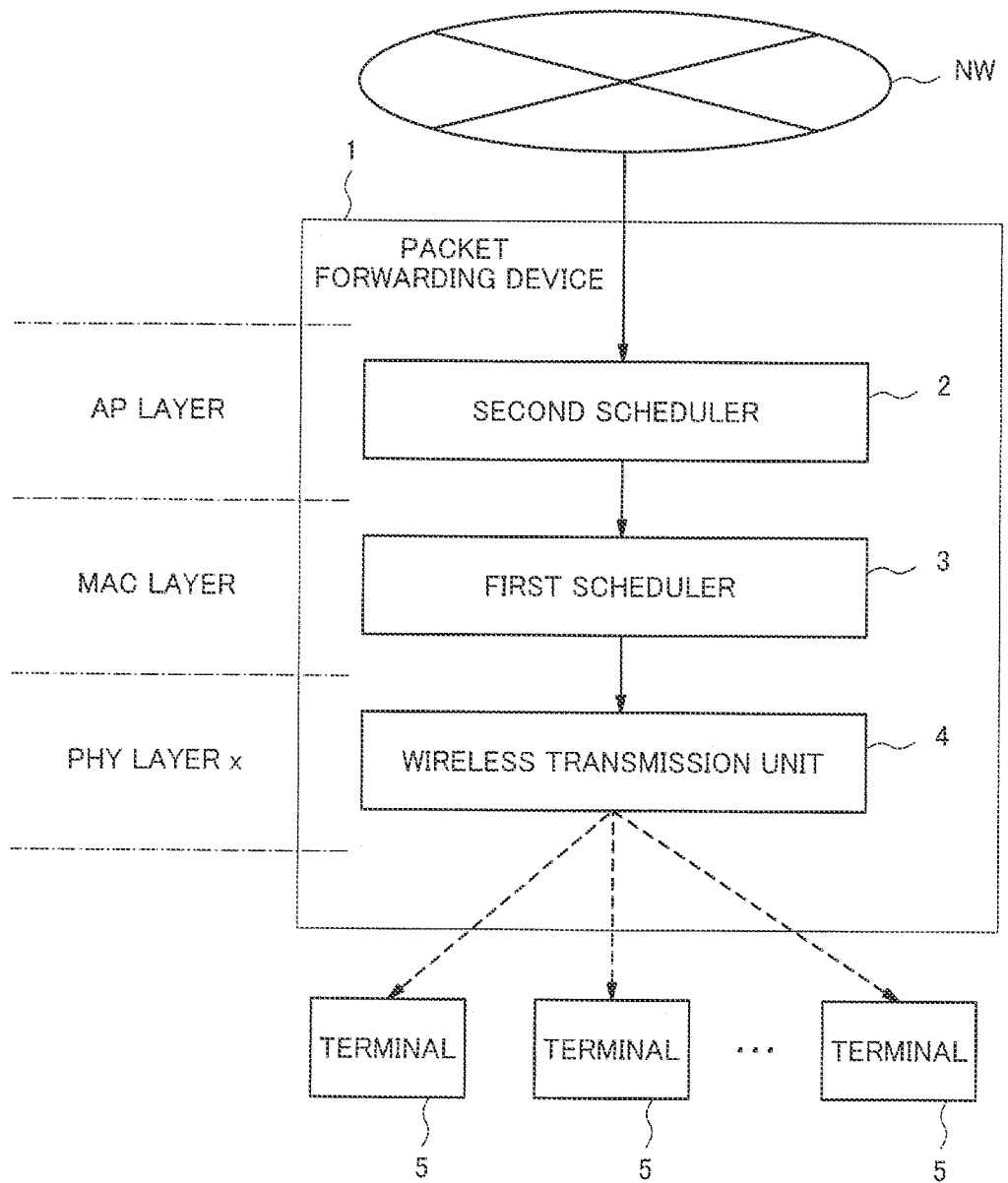
FIG. 1 shows a schematic configuration of a packet forwarding device according to a first exemplary embodiment of the present invention.

FIG. 1 shows a schematic configuration of a packet forwarding device 1 according to the first exemplary embodiment of the present invention.

As shown in FIG. 1, the packet forwarding device 1 according to this exemplary embodiment includes a second scheduler 2, a first scheduler 3, and a wireless transmission unit 4. The wireless transmission unit 4 is an example of communication means.

The packet forwarding device 1 receives the packet data from a network NW by wire communication (refer to a solid arrow). The packet forwarding device 1 forwards the packet data to a terminal 5 (information processing terminal) by wireless communication (refer to an arrow shown by a dotted line). The packet forwarding device 1 can be realized by the information processing device described later (further, a hardware configuration will be described in detail later in a hardware configuration example shown in FIG. 11).

Here, in the first exemplary embodiment of the present invention, assuming that the wireless transmission unit 4 and the first scheduler 3 are included in the existing packet forwarding device, explanation will be given. Namely, in the following explanation, the existing packet forwarding device includes the wireless transmission unit 4 and the first scheduler 3. More specifically, for example, in the 3G (Third Generation) mobile network, the "node B" corresponds to the packet forwarding device. Further, in the LTE (Long Term Evolution) mobile network, the "eNodeB" corresponds to the packet forwarding device. In a wireless LAN (Local Area Network), the "wireless LAN base station" corresponds to the packet forwarding device.

As shown in FIG. 1, the first scheduler 3 in the packet forwarding device mentioned above operates at the MAC (Media Access Control) layer. The wireless transmission unit 4 operates at the PHY (Physical) layer. The second scheduler 2 used in the first exemplary embodiment of the present invention is characterized by operating at the AP (Application) layer higher than the MAC layer. In the following description, each configuration and the operation of the packet forwarding device 1 will be described in detail.

Figure 2:
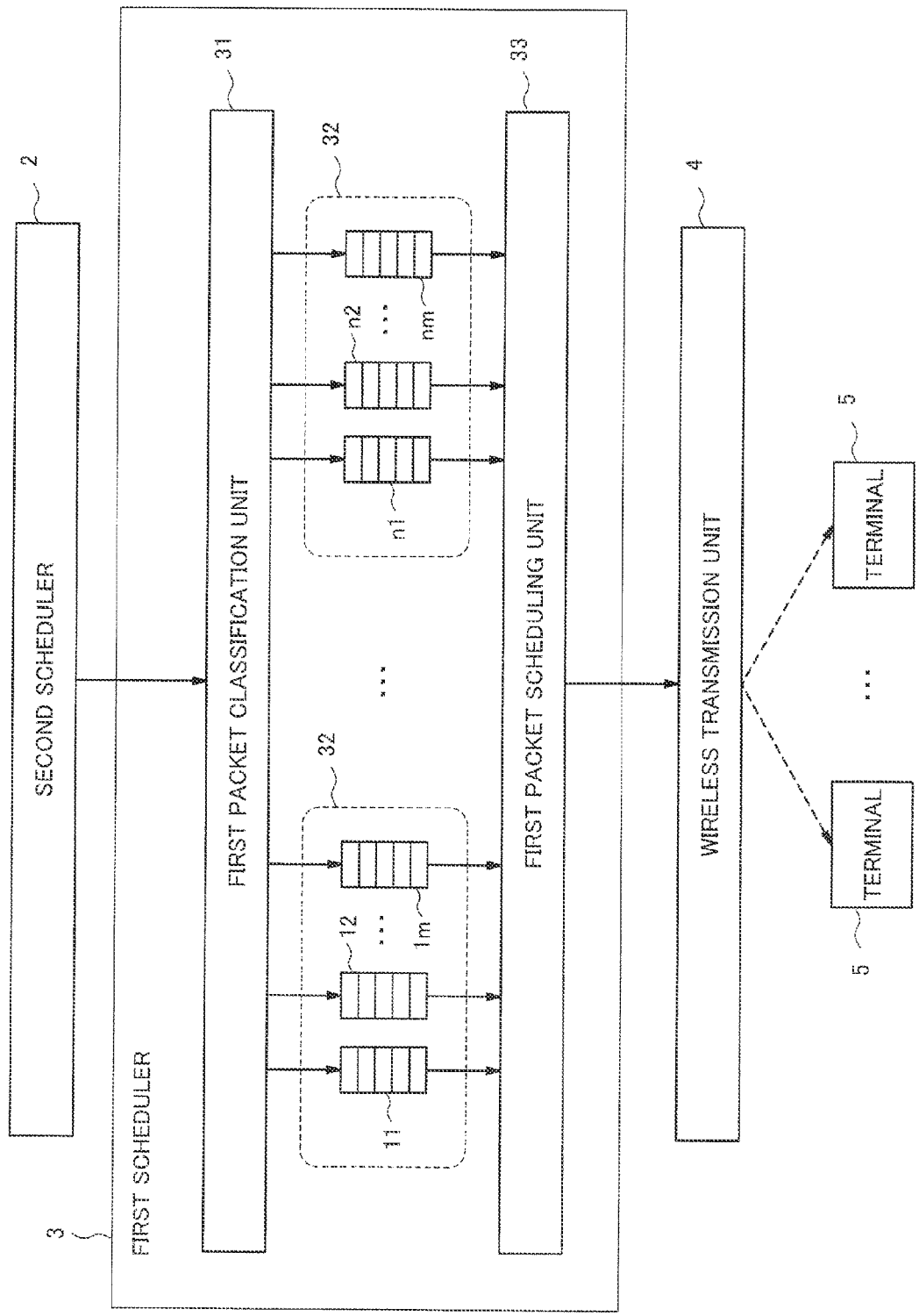
FIG. 2 is a block diagram showing a configuration of a first scheduler installed in a packet forwarding device disclosed in FIG. 1.

FIG. 2 is a block diagram showing a configuration of the first scheduler 3 installed in the packet forwarding device 1 disclosed in FIG. 1.

The first scheduler 3 includes a first packet classification unit 31, a first packet queue group 32, and a first packet scheduling unit 33.

As described later, the above-mentioned first scheduler 3 receives the packet data forwarded from the second scheduler 2. The first scheduler 3 has a function to forward the received packet data to the wireless transmission unit 4 so as to be forwarded to each terminal 5. Specifically, as shown in FIG. 2, the first packet queue group 32 is composed of one or more first packet queues 11 and the like that correspond to (are associated with) each of the terminals 5. The first packet classification unit 31 receives the packet data. The first packet classification unit 31 sorts the received packet data to the above-mentioned first packet queues 11 and the like. The first packet scheduling unit 33 performs scheduling of forwarding for the packet data based on a priority set to the first packet queues 11 and the like in advance. The first scheduler 3 including the first packet classification unit 31 and the first packet scheduling unit 33 mentioned above reads a computer program and stores it to an arithmetic unit installed in the packet forwarding device 1. When the arithmetic unit interprets and executes the computer program, the first scheduler 3 is constructed in the packet forwarding device 1.

The above-mentioned first packet queues 11 and the like temporarily accumulate the packet data to be forwarded. One or more first packet queues 11 and the like are prepared for each the terminal 5. The first packet queue group 32 is composed of the first packet queues 11 and the like and provided for each the terminal 5. FIG. 2 shows a case in which a plurality of the terminals 5 exist as the destination of the packet data in this exemplary embodiment. FIG. 2 shows a case in which m (m is more than one) first packet queues 11, 12, ..., and 1$m$ (the first packet queue group 32) are prepared for each the terminal 5. Accordingly, when n terminals 5 exist, first packet queues 11 and the like are prepared maximum of up to (n×m).

In each the first packet queue group 32, each of the first packet queues 11 and the like is classified according to a first classification (first classification information) set in advance. A priority indicating a degree of priority with which the packet data stored in each of the first packet queues 11 and the like is forwarded to the wireless transmission unit 4 (in other words, the terminal 5) is set to each of the first packet queues 11 and the like.

FIG. 3 is a figure showing an example (a setting example of the first classification and the priority) of a classification by the first packet classification unit disclosed in FIG. 2.

FIG. 3 shows an example of information set with respect to the first packet queues 11 and the like. In this example, the classification (the first classification) of the first packet queue 11 in the packet forwarding device 1 used in the LTE (Long Term Evolution) is shown. In FIG. 3, the first packet queue 11 is classified into nine first classifications (classes) according to "Type" shown in the first column and "Example Service" shown in the fourth column. "QCI" shown in the first column of FIG. 3 represents a Quality Class Identifier. Next, "GBR" shown in the second column of FIG. 3 represents Guaranteed Bit Rate. The first classification is not limited to the classification shown in FIG. 3 and the first packet queue 11 may be classified according to a use or a purpose of the packet data.

As shown in the third column of FIG. 3, the priority is set to each classification. In other words, the priority is set to the first packet queues 11 and the like. Information about the first packet queues 11 and the like shown in FIG. 3 is stored in the packet forwarding device 1.

FIG. 8 is a flowchart showing the operation of the first scheduler 3 installed in the packet forwarding device 1 disclosed in FIG. 1.

As described later, the above-mentioned first packet classification unit 31 receives the packet data forwarded from the second scheduler 2 (Step S1 of FIG. 8). The first packet classification unit 31 determines the terminal 5 that is the forwarding destination of the received packet data and the first classification (class) to which the packet data belongs (Step S2 of FIG. 8). At this time, the first packet classification unit 31 determines the terminal 5 that is the forwarding destination of the packet data and the first classification based on the information in the packet data and the above-mentioned information shown in FIG. 3 that is stored in the packet forwarding device 1.

The first packet classification unit 31 specifies the first packet queue group 32 corresponding to the terminal 5 that is the forwarding destination of the packet data according to a result of the above-mentioned determination. The first packet classification unit 31 specifies the first packet queues 11 and the like corresponding to the first classification of the packet data in the specified first packet queue group 32. The first packet classification unit 31 sorts the packet data to each of the first packet queues 11 and the like that is specified with respect to the packet data as mentioned above and stores it (Step S3 of FIG. 8).

The above-mentioned first packet scheduling unit 33 determines the scheduling used when the packet data accumulated in the each of the first packet queues 11 and the like is transmitted to each terminal 5 by wireless communication according to the above-mentioned priority of each of the first packet queues 11 and the like stored in the first scheduler 3 (Step S4 of FIG. 8). More specifically, for example, the first packet scheduling unit 33 determines the scheduling based on the priority set to the first packet queues 11 and the like and an index (for example, CQI (Channel Quality Indicator), SINR (Signal to Noise Interference Ratio), or the like) indicating a radio wave condition of each terminal 5. The first packet scheduling unit 33 forwards the packet data addressed to each terminal 5 that is stored in each first packet queue group 32 to the wireless transmission unit 4 according to the determined scheduling.

The above-mentioned wireless transmission unit 4 forwards the packet data forwarded from the first packet scheduling unit 33 to each terminal 5 according to the scheduling determined by the first packet scheduling unit 33.

The configuration of the first scheduler 3 and the wireless transmission unit 4 that are configured as described above is similar to the configuration of the wireless base station of the above mentioned 3G and LTE, WiMAX (Worldwide Interoperability for Microwave Access), or the like.

Next, the second scheduler 2 included in the packet forwarding device 1 according to the first exemplary embodiment of the present invention will be described.

Figure 4:
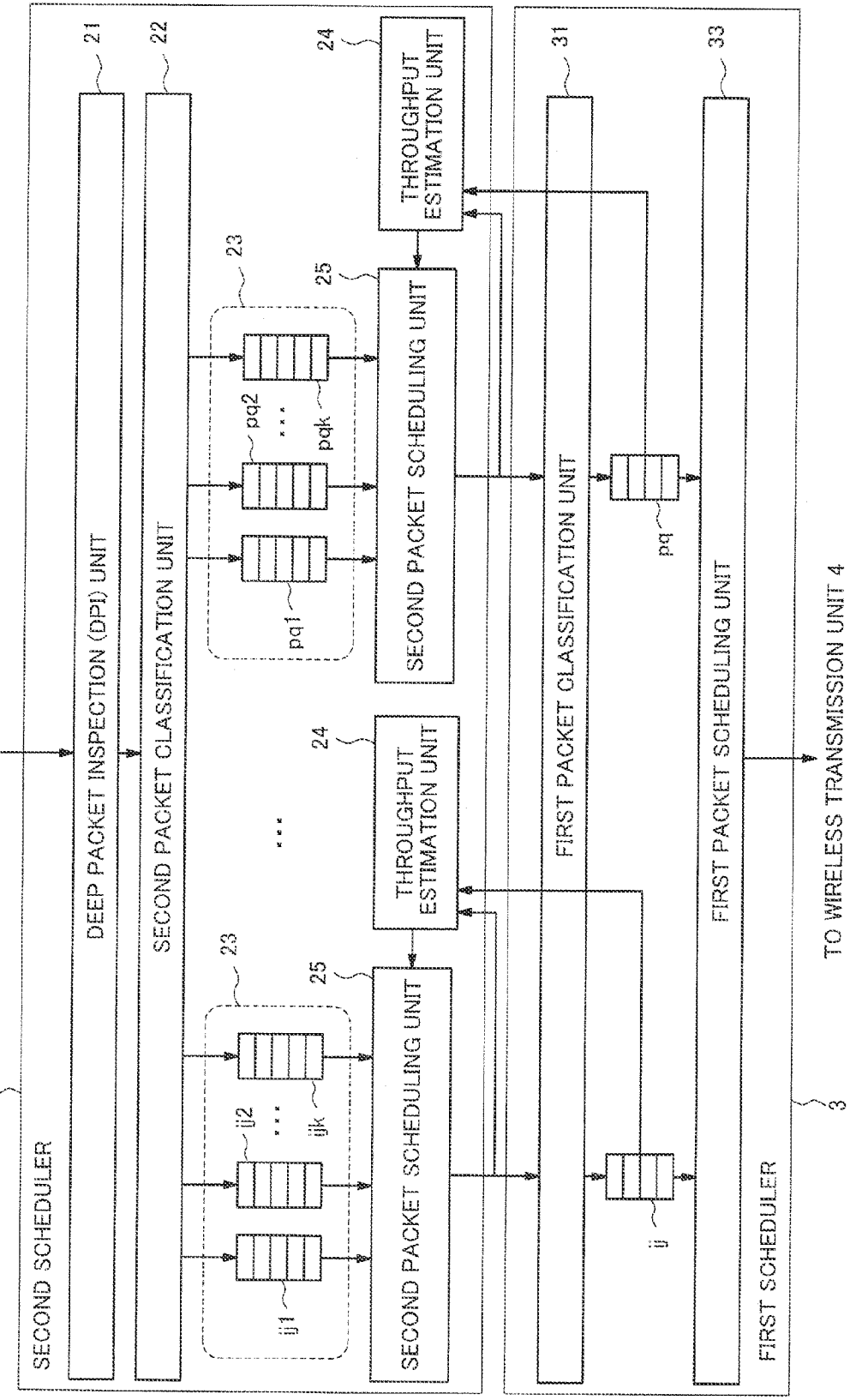
FIG. 4 is a block diagram showing a configuration of a second scheduler and a first scheduler installed in a packet forwarding device disclosed in FIG. 1.

FIG. 4 is a block diagram showing the configuration of the second scheduler 2 and the first scheduler 3 installed in the packet forwarding device 1 disclosed in FIG. 1.

The second scheduler 2 includes a deep packet inspection (hereinafter, abbreviated as "DPI") unit 21, a second packet classification unit 22, a second packet queue group 23, a throughput estimation unit 24, and a second packet scheduling unit 25.

The second scheduler 2 receives the packet data transmitted from the network NW. The second scheduler 2 has a function to forward the received packet data to the above-mentioned first scheduler 3. Specifically, as shown in FIG. 4, first, the second packet queue group 23 is composed of one or more second packet queues ij1 and the like corresponding to each of the first packet queues (ij and the like) included in the above-mentioned first scheduler 3.

The DPI unit 21 acquires the metadata of the packet data received from the network NW. Next, the second packet classification unit 22 sorts the packet data to the second packet queues ij1 and the like based on the metadata acquired by the DPI unit 21. The throughput estimation unit 24 estimates the throughput that is a data amount of the packet data per unit time forwarded to the terminal 5 from the first packet queue ij corresponding to the second packet queue ij1. The second packet scheduling unit 25 performs the scheduling of forwarding when performing the forwarding to the first scheduler 3 (first packet queue ij) from the second packet queue ij1 based on the estimated throughput and the priority set to the second packet queue ij1.

The second scheduler 2 including the above-mentioned DPI unit 21, the second packet classification unit 22, the throughput estimation unit 24, and the second packet scheduling unit 25 reads the computer program and stores it to the arithmetic unit installed in the packet forwarding device 1. When the arithmetic unit interprets and executes the computer program, the second scheduler 2 is constructed in the packet forwarding device 1.

The above mentioned second packet queues ij1 and the like temporarily accumulate the packet data to be forwarded. One or more second packet queues ij1 and the like are prepared for each of the first packet queues (ij and the like). The second packet queue group 23 corresponding to each of the first packet queues (ij and the like) is composed of the second packet queues ij1 and the like. In this exemplary embodiment, for example, FIG. 4 shows a state in which when the first packet queue ij exists in the first packet queue group (not shown) corresponding to the specific terminal (not shown), k second packet queues ij1, ij2, . . . , and ijk (the second packet queue group 23) corresponding to the first packet queue ij are prepared. At this time, the packet data stored in each of the second packet queues ij1, ij2, . . . , and ijk in the same second packet queue group 23 is forwarded to the same first packet queue ij corresponding to the second packet queues ij1 and the like at a later time.

In each second packet queue group 23, each of the second packet queues ij1 and the like is classified according to a second classification (second classification information) set in advance unlike the first classification mentioned above. The priority indicating a degree of priority with which the packet data stored in each of the second packet queues ij1 and the like is forwarded to the first packet queue ij or the like corresponding to each of the second packet queues ij1 and the like is set to each of the second packet queues ij1 and the like. Here, for example, the second classification mentioned above is a classification that is set corresponding to the metadata of the packet data. As an example, the second classification is determined based on a data type of the packet data as mentioned later. Although the second classification will be described in detail later, the second classification is not limited to the classification explained below.

FIG. 9 is a flowchart showing the operation of the second scheduler 2 installed in the packet forwarding device 1 disclosed in FIG. 4.

The above-mentioned deep packet inspection (DPI) unit 21 receives the packet data from the network NW (Step S11 of FIG. 9). The DPI unit 21 acquires the desired metadata about the packet data by checking header information and a payload of the packet data (Step S12 of FIG. 9). Namely, the deep packet inspection unit 21 functions as means for acquiring metadata.

Figure 5:
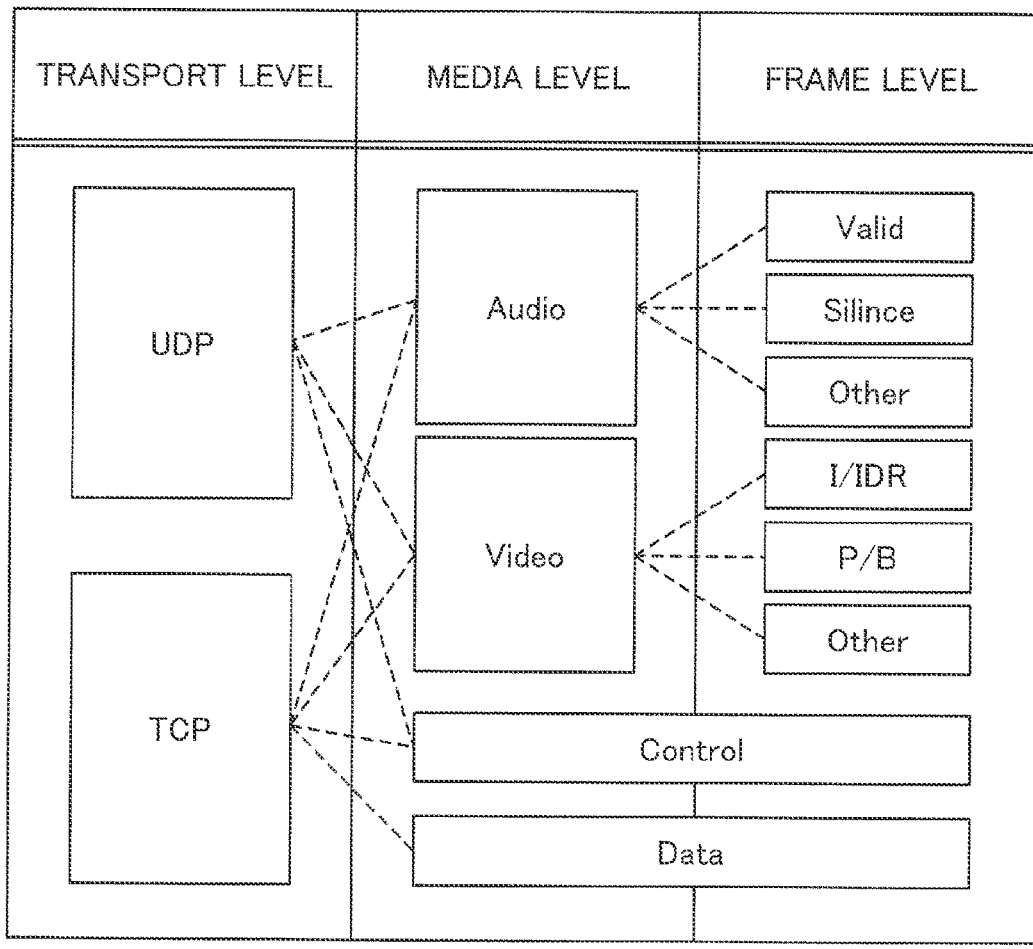
FIG. 5 is a figure showing an example of metadata acquired by a DPI unit disclosed in FIG. 4.

FIG. 5 is a figure showing an example of metadata acquired by the DPI unit disclosed in FIG. 4.

Here, as shown in FIG. 5, for example, transport level metadata, medium level metadata, or frame level metadata is acquired as metadata information.

Specifically, as the above-mentioned transport level metadata, a type of protocol for the transport layer of the packet data may be used. More specifically, for example, information indicating whether the packet data is encapsulated in a user datagram protocol (hereinafter, abbreviated as "UDP") packet or information indicating whether the packet data is encapsulated in a transmission control protocol (hereinafter, abbreviated as "TCP") packet can be used as the transport level metadata. As the media level metadata, a type of medium for the packet data may be used. More specifically, for example, information indicating whether the packet data is voice data, information indicating whether the packet data is video data, information indicating whether the packet data is control signal data, information indicating whether the packet data is other general data, or the like can be used as the media level metadata. As the frame level metadata, a type of frame for the media of the packet data may be used. More specifically, for example, when the media level is voice data, information indicating whether it is a sound frame, information indicating whether it is a silent frame, information indicating whether it is another frame, or the like can be used as the frame level metadata. When the media level is the video data, information indicating whether it is an I/IDR (Intra-coded/Instantaneous Decoder Refresh) frame, information indicating whether it is a P/B (Predicted/Bi-directional Predicted) frame, information indicating whether it is another frame, or the like can be used as the frame level metadata.

Here, when the metadata acquired by the DPI unit 21 is the above-mentioned information, the classification corresponding to the metadata is set to the second classification mentioned above. Each of the second packet queues ij1 and the like in the above-mentioned second packet queue group 23 is prepared according to the second classification. For example, when the classification is performed based on the media level metadata, three kinds of data the voice data, the video data, and other general data, are stored in the first packet queue ij. In this case, three second packet queues ij1 and the like the queue ij1 for video data, the queue ij2 for voice data, and the queue ij3 for other general data, are prepared in the second packet queue group 23 corresponding to the first packet queue ij. Information indicating a correspondence relationship between each of the second packet queues ij1 and the like mentioned above and the classification is stored in the packet forwarding device 1.

The above-mentioned second packet classification unit 22 determines the terminal 5 that is the forwarding destination of the packet data and the classification to which the packet data belongs based on the packet data itself and the metadata acquired by the above-mentioned DPI unit 21 (Step S13 of FIG. 8). Specifically, the second packet classification unit 22 determines the terminal 5 that is the forwarding destination of the packet data, the first classification (class) that specifies the first packet queue ij in the first packet queue group 32 corresponding to the terminal 5, and the second classification that specifies the second packet queues ij1 and the like in the second packet queue group 23 corresponding to the first packet queue ij based on the first classification stored in the above-mentioned packet forwarding device 1, information indicating the correspondence relationship between each of the second packet queues ij1 and the like and the classification, and the like.

The second packet classification unit 22 specifies the first packet queue ij in the first packet queue group 32 corresponding to the terminal 5 that is the forwarding destination of the packet data from the terminal 5 and the first classification that are determined based on a result of the above-mentioned determination. The second packet classification unit 22 specifies the second packet queues ij1 and the like in the second packet queue group 23 corresponding to the specified first packet queue from the determined second classification. The second packet classification unit 22 sorts the packet data to the second packet queues ij1 and the like that are specified with respect to the packet data as mentioned above and stores it (Step S14 of FIG. 8).

For example, it is assumed that when three second packet queues ij1 and the like are prepared for the voice data, the video data, and other general data, the above-mentioned DPI unit 21 acquires the media level metadata (voice data, video data, and other general data) from the received packet data. When the received packet data is the video data, the second packet classification unit 22 specifies the first packet queue ij corresponding to a certain specified terminal i (not shown). The second packet classification unit 22 sorts the packet data to the second packet queue for video data in the second packet queue group 23 corresponding to the specified first packet queue ij and stores it.

The above-mentioned throughput estimation unit 24 is prepared for each second packet queue group 23. The throughput estimation unit 24 calculates the throughput that is an amount of data per unit time forwarded to the terminal 5 from the first packet queue ij corresponding to the second packet queue group 23. More specifically, first, the throughput estimation unit 24 acquires a queue length that is a data amount of the packet data stored in the first packet queue ij corresponding to the second packet queue group 23. The throughput estimation unit 24 estimates the throughput that is the amount of the data per unit time forwarded to the terminal corresponding to the first packet queue ij from the first packet queue ji based on the acquired queue length and the amount of data per unit time inputted to the first packet queue ij (Step S15 of FIG. 9).

The specific estimation method performed by the above-mentioned throughput estimation unit 24 will be described with reference to FIG. 6. FIG. 6 is figure schematically showing the queue length of the packet queue installed in the packet forwarding device 1 disclosed in FIG. 1 and an input-output.

First, it is assumed that Q (the unit is byte or the like) is the queue length that is the data amount of the packet data stored in the first packet queue ij on which the attention is focused. It is assumed that v (the unit is byte per second or the like) is the amount of the data per unit time inputted to the first packet queue ij. It is assumed that w (the unit is byte per second or the like) is the amount of the data per unit time outputted from the first packet queue ij. In other words, w is the throughput. Here, the values of the above-mentioned Q, v, and w, vary over time. Accordingly, Q, v, and w can be represented as a function of time t: Q(t), v(t), and w(t). The amount of the data inputted to the first packet queue ij in a time interval from time t to time t+Δt can be approximated by v(t)Δt. Where t is a certain time and Δt is a very small time interval. The amount of the data outputted from the first packet queue ij in the same time interval can be approximated by w(t)Δt. Accordingly, a variation amount ΔQ of the queue length of the first packet queue ij in the same time interval is expressed as ΔQ=v(t)Δt−w(t)Δt. Here, when Δt is close to zero, the following differential equation 1 is obtained with respect to the queue length. Where, (dQ/dt) represents an amount obtained by differentiating Q by time t.

$$\frac{dQ}{dt} = v(t) - w(t), \quad (1)$$

From the above-mentioned differential equation 1, the throughput estimation unit 24 can estimate the amount of the data per unit time outputted from the first packet queue ij that is the throughput w by using the following equation 2.

$$w(t) = v(t) - \frac{dQ}{dt}, \quad (2)$$

As described above, first, the throughput estimation unit 24 can derive the temporal differentiation value (dQ/dt) of the queue length based on the queue length of the first packet queue ij corresponding to the second packet queue group 23. The throughput estimation unit 24 acquires the data amount v per unit time inputted to the first packet queue ij corresponding to the second packet queue group 23 from the second packet scheduling unit 25 mentioned later. The throughput estimation unit 24 subtracts the temporal differentiation value (dQ/dt) of the queue length of the first packet queue ij from the data amount v per unit time inputted to the first packet queue ij corresponding to the second packet queue group 23. As a result, the throughput estimation unit 24 can estimate the throughput w that is the amount of the data per unit time forwarded to the terminal 5 corresponding to the first packet queue ij from the first packet queue ij.

The method of estimating the above-mentioned throughput w that is the amount of the data per unit time forwarded to the terminal corresponding to the first packet queue ij from the first packet queue ij performed by the throughput estimation unit 24 is not limited to the above-mentioned method. For example, the above-mentioned throughput w is the data amount determined by the above-mentioned first packet scheduling unit 33. Therefore, the throughput estimation unit 24 may directly or indirectly acquire the throughput w from the first packet scheduling unit 33.

When the throughput estimation unit 24 cannot acquire the throughput from the above-mentioned first packet scheduling unit 33 and the scheduling method of the first packet scheduling unit 33 is known, the throughput estimation unit 24 may estimate the throughput by simulating the scheduling method. However, when the scheduling method uses information (for example, an index indicating a radio wave intensity) or the like that is fed back from the terminal 5, the throughput estimation unit 24 needs to have a configuration in which the information can be acquired.

The above-mentioned second packet scheduling unit 25 is prepared for each second packet queue group 23. The second packet scheduling unit 25 determines a schedule which determines the data amount taken from the second packet queues ij and the like when it is outputted to the first packet queue ij based on the throughput that is the amount of the data per unit time transmitted to the terminal 5 from the first packet queue ij corresponding to the second packet queue group 23 estimated by the above-mentioned throughput estimation unit 24, the priority set to each of the second packet queues ij1 and the like in the second packet queue group 23, and the queue length that is the data amount stored in the second packet queues ij1 and the like (Step S16 of FIG. 9).

Here, the scheduling method of the second packet scheduling unit 25 will be described with reference to FIG. 7 that is a schematic diagram showing input-output of the second packet queue group 23 and the first packet queue ij. In FIG. 7, the second packet queue group 23 includes k second packet queues. Where, qi is the queue length that is the data amount stored in the i-th second packet queue (i=1, 2, . . .

, and k). In FIG. 7, ui is the amount of the data per unit time inputted to the i-th second packet queue from the above-mentioned second packet classification unit 22. In FIG. 7, ϕi is the priority of the i-th second packet queue. However, the priority ϕi satisfies the following equation 3.

$$\sum_{i=1}^{k} \phi_i = 1 \quad (3)$$

and $$\phi_i \geq 0 \ (i = 1, 2, \ldots, k)$$

Here, vi is the amount of the data taken per unit time when the second packet scheduling unit 25 takes the data from the i-th second packet queue and inputs it to the first packet queue corresponding to the second packet queue group 23. To determine vi is to determine the schedule.

The second packet scheduling unit 25 may adopt the method in which the above-mentioned vi is determined by the following equation 4. This method is called Adaptive WFQ (Weighted Fair Queuing). This method is designed so that the higher the priority is or the longer the queue length is, the greater vi becomes. Where, w is the throughput estimated by the above-mentioned throughput estimation unit 24.

$$v_i(t) = \left( \frac{\phi_i q_i(t)}{\sum_{i=1}^{k} \phi_i q_i(t)} \right) w(t), \quad (4)$$

On the one hand, when the calculation method using the above-mentioned equation 4 is used, even when the priority ϕi is high, the queue length is short. Namely, when qi is close to zero, the data amount vi per unit time is simultaneously close to zero. Therefore, the data amount per unit time taken from the second packet queue becomes small. In such case, when the method is used, a problem in which even when the priority is high, the packet is hardly forwarded occurs.

Accordingly, by changing the calculation method from the above-mentioned method to a method using the following equation 5, the second packet scheduling unit 25 can use the calculation method by which even when qi is close to zero, vi does not become unnecessarily small. In equation 5, (1+qi) is used instead of the queue length qi in equation 4. As a result, in equation 5, when qi becomes zero, (1+qi) is equal to 1 and whereby, vi does not become zero. In equation 5, by raising (1+qi) to the ri-th power, the ratio of the increment of vi to the increment of the queue length can be adjusted. Where, ri is a real number of 0 or more set to each second packet queue. When ri is great, the ratio of the increment of vi to the increment of the queue length is great. On the other hand, when ri is small (closer to zero), the ratio of the increment of vi to the increment of the queue length is small. H(x) is a heaviside step function. H(x)=1 when x>0 and H(x)=0 when x<0 or x=0. By multiplying the numerator and the denominator of the equation (4) by H(qi), the value of vi is made equal to zero when the queue length is equal to zero.

$$v_i(t) = \left( \frac{\phi_i (1 + q_i(t))^{r_i} H(q_i(t))}{\sum_{i=1}^{k} \phi_i (1 + q_i(t))^{r_i} H(q_i(t))} \right) w(t), \quad (5)$$

The second packet scheduling unit 25 takes the data from each second packet queue based on vi determined as mentioned above and forwards the packet data to the first packet queue of the first scheduler corresponding to the second packet queue group 23. At this time, the amount of the data of v=Σ(sigma) vi per unit time is inputted to the first packet queue.

In the above-mentioned method, the second packet scheduling unit 25 determines the amount of the data outputted to the first packet queue based on the throughput estimated by the throughput estimation unit 24, the priority of the second packet queue, and the queue length stored in the second packet queue and performs the scheduling. However, a method used for this exemplary embodiment according to the present invention is not necessarily limited to the method mentioned above. For example, the second packet scheduling unit 25 may determine the amount of the data outputted to the first packet queue based on the throughput estimated by the throughput estimation unit 24 and the priority of the second packet queue and perform the scheduling. As an example, the second packet scheduling unit 25 may determine a value obtained by performing the weighting in which the estimated throughput is weighted by the priority of the corresponding second packet queue as the amount of the data outputted to the first packet queue and whereby, the data is forwarded to the first packet queue so that the higher the priority is the greater the amount of the data outputted to the first packet queue becomes.

As described above, by using the packet forwarding device 1 according to the first exemplary embodiment of the present invention, QoS control can be made sophisticated by additionally installing the second scheduler to an input portion of the first scheduler of the existing packet forwarding device. For example, as described above, as shown in FIG. 3, only nine packet queues are prepared in the LTE. However, in recent years, the use of the packet data network such as the Internet, a mobile network, or the like is expanding. Therefore, there is a possibility that the desired QOS control cannot be realized by using only nine packet queues set in advance. In fact, various services (such as a video streaming service, a web service, a SNS service, a messaging service, and the like) deployed in the Internet are classified as the class 6, the class 8, or the class 9 shown in FIG. 3. Therefore, the QoS control cannot be precisely performed to each service.

In contrast, in the packet forwarding device 1 according to the first exemplary embodiment of the present invention, for example, by providing a plurality of second packet queues at an input portion of the class 6, the class 8, or the class 9 of FIG. 3, the second packet scheduling unit 25 performs the QoS control for each class. By this method, the packet forwarding device 1 can realize the sophisticated QoS control by using the existing scheduler without modifying it. In particular, in the packet forwarding device 1, the existing scheduler is used without modifying it and only the required queue (class) among the first packet queues is sophisticated by the second scheduler 2. As a result, the development cost can be reduced in the packet forwarding device 1.

When the packet forwarding device 1 according to the first exemplary embodiment of the present invention is used, the input-output interface of the packet forwarding device can be maintained to be the same as the input-output interface of the existing packet forwarding device. In other words, the second scheduler 2 in the packet forwarding device 1 only changes an order of the packet data received by the first scheduler that is the existing packet forwarding device. Therefore, the input interface to the packet forwarding device 1 is the same as the input interface to the existing packet forwarding device. It is also clear from FIG. 4 that the output interface of the packet forwarding device 1 is the same as the output interface of the existing packet forwarding device.

As mentioned above, the packet forwarding device 1 according to the first exemplary embodiment of the present invention can be operated within a standard specification that is the same as that of the existing packet forwarding device. For this reason, the packet forwarding device 1 according to this exemplary embodiment can be applied to all devices and easily introduced.

As described above, the packet forwarding device 1 according to the first exemplary embodiment of the present invention can be applied to the wireless base station or the like. However, the exemplary embodiment according to the present invention is not limited to a device which forwards the packet data by wireless communication. The packet forwarding device 1 can be applied to a device which forwards the packet data in a wired communication line or a communication line in which a wireless line and a wired line are appropriately used.

<Second Exemplary Embodiment>

A part or all of the above-mentioned exemplary embodiment can be described as the following second exemplary embodiment. A packet forwarding device (refer to FIG. 10), a computer program, and a summary of a construction of a packet forwarding method according to the second exemplary embodiment of the present invention will be described. However, for convenience of explanation, the second exemplary embodiment of the present invention will be described by using the following configuration as an example. However, the configuration is not limited to the following configuration.

Figure 10:
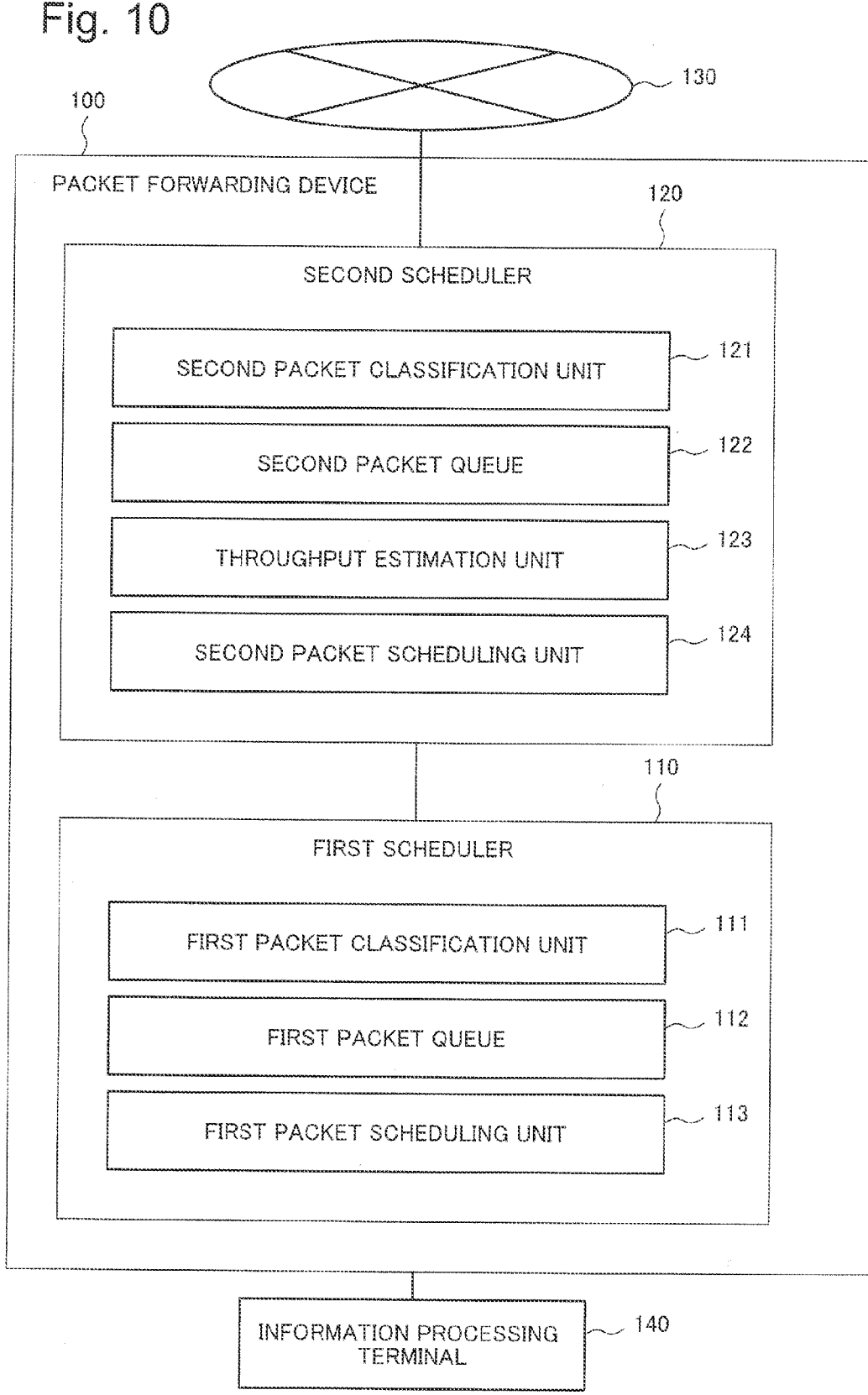
FIG. 10 is a block diagram showing a configuration of a packet forwarding device according to a second exemplary embodiment of the present invention.

FIG. 10 is a block diagram showing a configuration of a packet forwarding device 100 according to the second exemplary embodiment of the present invention.

The packet forwarding device 100 mainly includes a second scheduler 120 and a first scheduler 110.

The packet forwarding device 100 forwards the packet data received via a network 130 to an information processing terminal 140.

More specifically, the first scheduler 110 includes a first packet classification unit 111 and a first packet scheduling unit 113.

The first packet classification unit 111 sorts the received packet data to one or more first packet queues 112 corresponding to each of the information processing terminals 140 according to the first classification of the packet data set in advance and accumulates it.

The first packet scheduling unit 113 forwards the packet data accumulated in each first packet queue 112 to the information processing terminal 140 corresponding to the first packet queue 112 based on the priority set to each first packet queue 112 in advance.

The second scheduler 120 includes a second packet classification unit 121, a throughput estimation unit 123, and a second packet scheduling unit 124.

The second packet classification unit 121 sorts the packet data to one or more second packet queues 122 corresponding to each of the first packet queues 112 included in the first scheduler 110 based on the second classification different from the first classification of the packet data received via the network 130 that is set in advance and accumulates it.

The throughput estimation unit 123 estimates the throughput indicating the amount of the packet data per unit time forwarded to the information processing terminal 140 from the first packet queue 112 corresponding to the second packet queue 122.

The second packet scheduling unit 124 forwards the packet data accumulated in each second packet queue 122 to the first scheduler 110 including the first packet queue 112 corresponding to the second packet queue 122 based on the throughput and the priority set to each second packet queue in advance.

By the second exemplary embodiment having such configuration, the packet forwarding device which can realize the desired QOS control, can reduce the development cost, and can be easily introduced and the like can be realized like the first exemplary embodiment mentioned above.

(Example of Hardware Configuration)

In each exemplary embodiment mentioned above, each unit shown in FIG. 1, FIG. 2, FIG. 4, and FIG. 10 can be regarded as a function (processing) unit (software module) of a software program. A function of each unit shown in these figures is determined for convenience of explanation. Therefore, in an actual case, other various configurations in which the information processing device and the scheduler are composed of a functional unit different from that shown in FIG. 1, FIG. 2, FIG. 4, and FIG. 10 may be used. With respect to such case, an example of a hardware environment (hardware resource) will be described with reference to FIG. 11.

Figure 11:
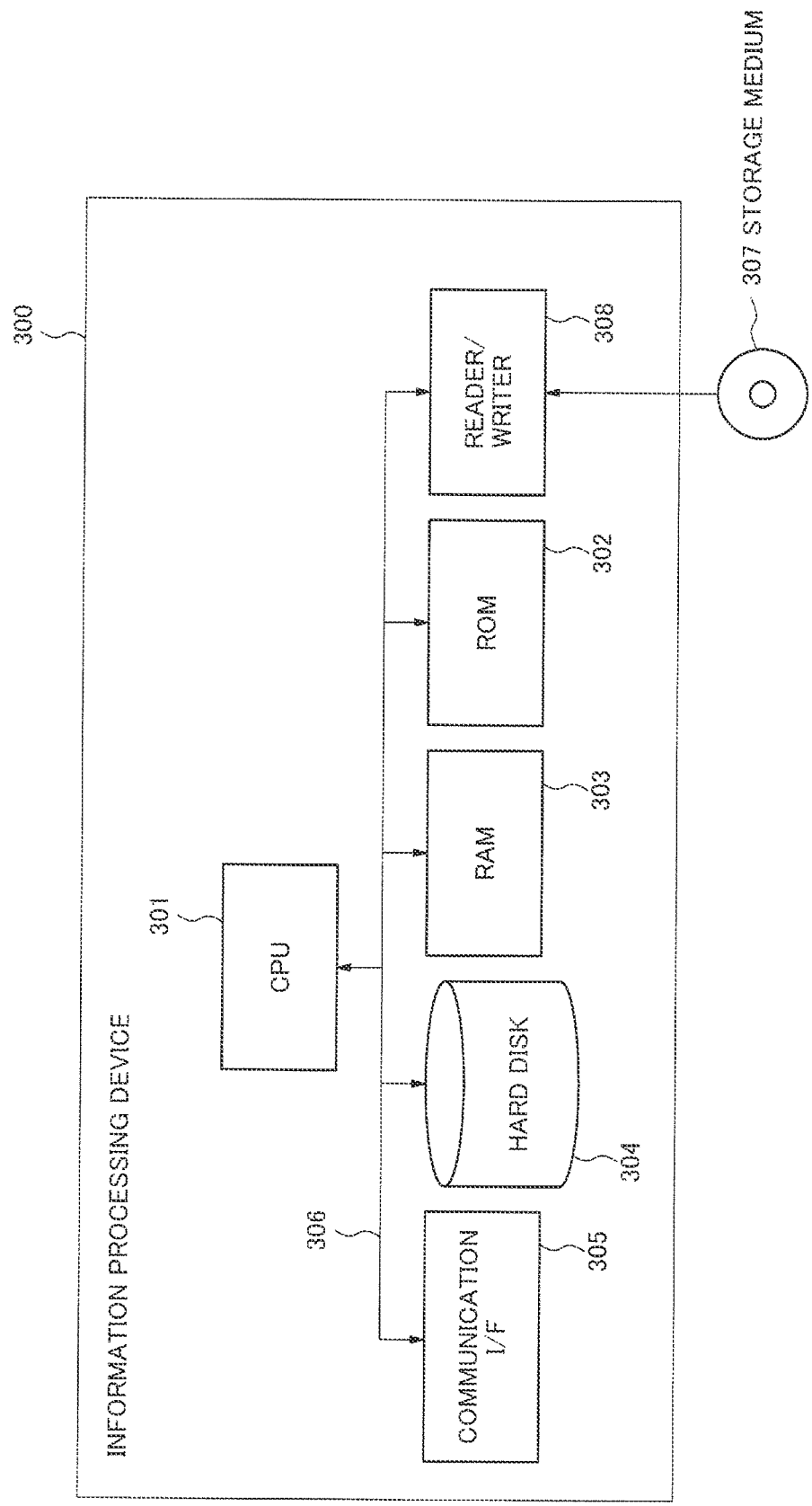
FIG. 11 is a block diagram shown as an example for explaining a hardware configuration of an information processing device which can realize each exemplary embodiment according to the present invention.

FIG. 11 is a figure for exemplifying a configuration of an information processing device (computer) 300 which can operate as the packet forwarding device according to the exemplary embodiment of the present invention. Namely, FIG. 11 shows a configuration of a computer (information processing device) such as a server or the like which can realize the packet forwarding device 1 shown in FIG. 1, or the first scheduler 3 installed in the packet forwarding device 1 shown in FIG. 2, the second scheduler 2 installed in the packet forwarding device 1 shown in FIG. 4, and the all or a part of the packet forwarding device 100 shown in FIG. 10. FIG. 11 shows the hardware environment which can realize each function in the above-mentioned exemplary embodiment.

The information processing device 300 shown in FIG. 11 includes a CPU (Central_Processing_Unit) 301, a ROM (Read_Only_Memory) 302, a RAM (Random_Access_Memory) 303, a hard disk 304 (a storage device), a communication interface (hereinafter, referred to as "I/F") 305 used for communication with an external device, and a reader/writer 308 which can read and write the data stored in a storage medium 307 such as a CD-ROM (Compact_Disc_Read_Only_Memory) or the like. The information processing device 300 is a general computer in which the above-mentioned components are connected to each other via a bus 306 (a communication line).

The present invention that has been described by using the above-mentioned exemplary embodiment as an example can be realized as follows. A computer program which can realize the function shown in the block configuration diagrams (FIG. 1, FIG. 2, FIG. 4, and FIG. 10) or the flowcharts (FIG. 8 and FIG. 9) referred to in the explanation of the exemplary embodiment is provided to the information processing device 300 shown in FIG. 11 and after that, the information processing device 300 reads the computer program, stores it in the CPU 301 of the hardware, interprets it, and executes it. Whereby, the present invention can be realized. The computer program supplied to the device may be stored in a readable and writable volatile storage memory (RAM 303) or a non-volatile storage device such as the hard disk 304 or the like.

When the above-mentioned method is used, as a method for supplying the computer program to the hardware, a method commonly used at present such as a method by which the computer program is installed in the device via the various storage media 307 such as the CD-ROM or the like, a method by which the computer program is downloaded from the outside via the communication line such as the Internet or the like, or another method can be adopted. In such case, it can be understood that the present invention is configured of a code of which the computer program is composed or the storage medium 307 storing the code.

A part of or all of each exemplary embodiment mentioned above can be described as the following supplementary note. However, the present invention explained by using the above-mentioned exemplary embodiment as an example is not limited to the following supplementary note. Namely, (Supplementary Note 1)

A packet forwarding device which forwards packet data received via a network to an information processing terminal, including:

a first scheduler including a first packet classification unit for sorting the packet data to one or more first packet queues corresponding to each of the information processing terminals in accordance with a first classification information and accumulating it, and a first packet scheduling unit for forwarding the packet data accumulated in each first packet queue to the information processing terminal corresponding to the first packet queue based on a priority set to each first packet queue; and a second scheduler including a second packet classification unit for sorting the packet data to one or more second packet queues corresponding to each of the first packet queues based on a second classification information different from the first classification information and accumulating it, a throughput estimation unit for estimating a throughput indicating an amount of the packet data per unit time forwarded to the information processing terminal from the first packet queue corresponding to the second packet queue, and a second packet scheduling unit for forwarding the packet data accumulated in each second packet queue based on the throughput and the priority set to each second packet queue.

(Supplementary Note 2)

The packet forwarding device according to supplementary note 1, wherein:

the second packet scheduling unit calculates the amount of the packet data per unit time forwarded to the first scheduler including the first packet queue corresponding to each of the second packet queues based on the throughput, the priority set to each second packet queue, and the amount of the packet data accumulated in each second packet queue, obtaining the packet data accumulated in each second packet queue based on the calculated packet data amount, and forwards it to the first scheduler.

(Supplementary Note 3)

The packet forwarding device according to supplementary note 2, wherein:

the second packet scheduling unit calculates the packet data amount so that the higher the priority set to the second packet queue is and the greater the amount of the packet data accumulated in the second packet queue is, the greater the amount of the packet data forwarded to the first scheduler from the second packet queue becomes.

(Supplementary Note 4)

The packet forwarding device according to any one of supplementary notes 1 to 3, wherein:

the throughput estimation unit estimates the throughput indicating the amount of the packet data per unit time forwarded to the information processing terminal from the first packet queue based on the amount of the packet data accumulated in the first packet queue corresponding to the second packet queue.

(Supplementary Note 5)

The packet forwarding device according to supplementary note 4, wherein:

the throughput estimation unit calculates a value obtained by subtracting a temporal differentiation value of the amount of the packet data accumulated in the first packet queue from the amount of the packet data per unit time inputted to the first packet queue corresponding to the second packet queue as the throughput.

(Supplementary Note 6)

The packet forwarding device according to any one of supplementary notes 1 to 5, wherein:

the second packet classification unit sorts the packet data to each second packet queue based on a data type included in the second classification and accumulates it.

(Supplementary Note 7)

The packet forwarding device according to supplementary note 6, wherein:

the second packet classification unit sorts the packet data to each second packet queue based on one of a protocol type in a transport layer of the packet data, a media type, and a frame type of a medium and accumulates it.

(Supplementary Note 8)

A computer program controlling an operation of a packet forwarding device that forwards packet data received via a network to an information processing terminal, causing a computer to realize:

a function that sorts the packet data to one or more first packet queues corresponding to each of the information processing terminals according to a first classification information, accumulate it, and forwards the packet data accumulated in each first packet queue to the information processing terminal corresponding to the first packet queue based on a priority set to each first packet queue; and a function that sorts the packet data to one or more second packet queues corresponding to each of the first packet queues based on a second classification information different from the first classification information, accumulate it, estimates a throughput indicating an amount of the packet data per unit time forwarded to the information processing terminal from the first packet queue corresponding to the second packet queue, and forwards the packet data accumulated in each second packet queue based on the throughput and the priority set to each second packet queue.

(Supplementary Note 9)

The program according to supplementary note 8, wherein:

calculating the amount of the packet data per unit time forwarded to the first scheduler including the first packet queue corresponding to each of the second packet queues based on the throughput, the priority set to each second packet queue in advance, and the amount of the packet data accumulated in each second packet queue, the packet data accumulated in each second packet queue, obtaining the packet data accumulated in each second packet queue based on the calculated packet data amount, and forwarding it to the first scheduler.

(Supplementary Note 10)

A packet forwarding method in a packet forwarding device that forwards a packet data received via a network to an information processing terminal, including:

sorting the packet data to one or more first packet queues corresponding to each of the information processing terminals according to a first classification information, accumulating it, and forwarding the packet data accumulated in each first packet queue to the information processing terminal corresponding to the first packet queue based on a priority set to each first packet queue; and sorting the packet data to one or more second packet queues corresponding to each of the first packet queues based on a second classification information different from the first classification information, accumulating it, estimating a throughput indicating an amount of the packet data per unit time forwarded to the information processing terminal from the first packet queue corresponding to the second packet queue, and forwarding the packet data accumulated in each second packet queue based on the throughput and the priority set to each second packet queue.

(Supplementary Note 11)

The packet forwarding method according to supplementary note 10, wherein:

calculating the amount of the packet data per unit time forwarded to the first scheduler including the first packet queue corresponding to each second packet queue based on the throughput, the priority set to each second packet queue in advance, and the amount of the packet data accumulated in each second packet queue, obtaining the packet data accumulated in each second packet queue based on the calculated packet data amount, and forwarding it to the first scheduler.

The invention of the present application has been described above with reference to the above-mentioned exemplary embodiment. However, the invention of the present application is not limited to the above-mentioned exemplary embodiment. Various changes in the configuration or details of the invention of the present application that can be understood by those skilled in the art can be made without departing from the scope of the invention of the present application.

The present invention has been described above with reference to the above-mentioned exemplary embodiment shown as an exemplary example. However, the present invention is not limited to the above-mentioned exemplary embodiment. Namely, the present invention can be carried out by various modes that may be understood by those skilled in the art within the scope of the present invention.

This application claims priority based on Japanese Patent Application No. 2012-046675 filed on Mar. 2, 2012, the disclosure of which is hereby incorporated by reference in its entirety.

REFERENCE SIGNS LIST

1 packet forwarding device
11 first packet queue
2 second scheduler
21 deep packet inspection (DPI) unit
22 second packet classification unit
23 second packet queue group (second packet queue)
24 throughput estimation unit
25 second packet scheduling unit
3 first scheduler
31 first packet classification unit
32 first packet queue group (first packet queue)
33 first packet scheduling unit
4 wireless transmission unit
5 terminal
NW network
100 packet forwarding device
110 first scheduler
111 first packet classification unit
112 first packet queue
113 first packet scheduling unit
120 second scheduler
121 second packet classification unit
122 second packet queue
123 throughput estimation unit
124 second packet scheduling unit

The invention claimed is:

1. A packet forwarding device which forwards packet data received via a network to an information processing terminal, comprising:

a first scheduler configured to
sort the packet data to one or more first packet queues corresponding to each of the information processing terminals in accordance with a first classification information and accumulate the packet data, and
forward the packet data accumulated in each first packet queue to the information processing terminal corresponding to the first packet queue based on a priority set to each first packet queue; and a second scheduler configured to
sort the packet data to one or more second packet queues corresponding to each of the first packet queues based on a second classification information different from the first classification information,
accumulate the packet data,
estimate a throughput indicating an amount of the packet data per unit time forwarded to the information processing terminal from the first packet queue corresponding to the second packet queue,
calculate the amount of the packet data per unit time forwarded to the first scheduler including the first packet queue corresponding to each of the second packet queues based on the throughput, the priority set to each second packet queue, and the amount of the packet data accumulated in each second packet queue,
obtain the packet data accumulated in each second packet queue based on the calculated packet data amount, and
forward the packet data accumulated in each second packet queue to the first scheduler, wherein
the second scheduler is configured to calculate the packet data amount so that the higher the priority set to the second packet queue is and the greater the amount of the packet data accumulated in the second packet queue is, the greater the amount of the packet data forwarded to the first scheduler from the second packet queue becomes.

2. The packet forwarding device according to claim 1, wherein:
the second scheduler is configured to estimate the throughput indicating the amount of the packet data per unit time forwarded to the information processing terminal from the first packet queue based on the amount of the packet data accumulated in the first packet queue corresponding to the second packet queue.

3. The packet forwarding device according to claim 2, wherein:

the second scheduler is configured to calculate a value obtained by subtracting a temporal differentiation value of the amount of the packet data accumulated in the first packet queue from the amount of the packet data per unit time inputted to the first packet queue corresponding to the second packet queue as the throughput.

4. The packet forwarding device according to claim 1, wherein:
the second scheduler is configured to sort the packet data to each second packet queue based on a data type included in the second classification information and accumulate the packet data.

5. The packet forwarding device according to claim 4, wherein:
the second scheduler is configured to sort the packet data to each second packet queue based on one of a protocol type in a transport layer of the packet data, a media type, and a frame type of a medium and accumulate the packet data.

6. A non-transitory computer readable media storing, a computer program controlling an operation of a packet forwarding device that forwards packet data received via a network to an information processing terminal, causing a computer to realize a set of functions, the set of functions comprising:
sorts the packet data to one or more first packet queues corresponding to each of the information processing terminals according to a first classification information, accumulates the packet data, and
forwards the packet data accumulated in each first packet queue to the information processing terminal corresponding to the first packet queue based on a priority set to each first packet queue,
sorts the packet data to one or more second packet queues corresponding to each of the first packet queues based on a second classification information different from the first classification information,
accumulates the packet data,
estimates a throughput indicating an amount of the packet data per unit time forwarded to the information processing terminal from the first packet queue corresponding to the second packet queue,
calculates the amount of the packet data per unit time forwarded to the first packet queue corresponding to each of the second packet queues based on the throughput, the priority set to each second packet queue, and the amount of the packet data accumulated in each second packet queue, the packet data accumulated in each second packet queue,
obtains the packet data accumulated in each second packet queue based on the calculated packet data amount, and
forward the packet data accumulated in each second packet queue to the first packet queue, wherein
the higher the priority set to the second packet queue is and the greater the amount of the packet data accumulated in the second packet queue is, the greater the amount of the packet data forwarded to the first packet queue from the second packet queue becomes.

7. A packet forwarding method comprising: in a packet forwarding device that forwards packet data received via a network to an information processing terminal, comprising:
sorting the packet data to one or more first packet queues corresponding to each of the information processing terminals according to a first classification information, accumulating the packet data, and forwarding the packet data accumulated in each first packet queue to the information processing terminal corresponding to the first packet queue based on a priority set to each first packet queue; and
sorting the packet data to one or more second packet queues corresponding to each of the first packet queues based on a second classification information different from the first classification information, accumulating the packet data, estimating a throughput indicating an amount of the packet data per unit time forwarded to the information processing terminal from the first packet queue corresponding to the second packet queue, and calculating the amount of the packet data per unit time forwarded to the first packet queue corresponding to each second packet queue based on the throughput, the priority set to each second packet queue, and the amount of the packet data accumulated in each second packet queue, obtaining the packet data accumulated in each second packet queue based on the calculated packet data amount, and forwarding it to the first packet queue, wherein
the higher the priority set to the second packet queue is and the greater the amount of the packet data accumulated in the second packet queue is, the greater the amount of the packet data forwarded to the first packet queue from the second packet queue becomes.

* * * * *